(12) United States Patent
Jeon et al.

(10) Patent No.: US 9,083,569 B2
(45) Date of Patent: Jul. 14, 2015

(54) APPARATUS AND METHOD FOR DETECTING BROADCASTING SIGNAL

(75) Inventors: Won Gi Jeon, Yongin-si (KR); Kyung Taek Lee, Seongnam-si (KR); Kyung Won Park, Seoul (KR); Seong Jun Kim, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 518 days.

(21) Appl. No.: 13/341,415

(22) Filed: Dec. 30, 2011

(65) Prior Publication Data

US 2013/0163703 A1 Jun. 27, 2013

(30) Foreign Application Priority Data

Dec. 27, 2011 (KR) .......................... 10-2011-0143756

(51) Int. Cl.
  *H04B 1/16* (2006.01)
  *H04L 27/00* (2006.01)
  *H04L 27/14* (2006.01)
  *H04L 27/26* (2006.01)

(52) U.S. Cl.
  CPC ............ *H04L 27/0012* (2013.01); *H04L 27/14* (2013.01); *H04L 27/2647* (2013.01); *H04L 27/2605* (2013.01)

(58) Field of Classification Search
  CPC .. H04L 27/0012; H04L 27/2647; H04L 27/14
  USPC ........................................ 375/343; 455/552.1
  See application file for complete search history.

(56) References Cited

U.S. PATENT DOCUMENTS

| 7,400,904 | B2 * | 7/2008 | Cornwall et al. | ........... 455/552.1 |
| 2002/0094048 | A1 * | 7/2002 | Simmons et al. | ............. 375/362 |
| 2003/0076877 | A1 * | 4/2003 | Nakamura | ..................... 375/150 |
| 2006/0140110 | A1 * | 6/2006 | Lin | ............................... 370/208 |
| 2006/0193408 | A1 * | 8/2006 | Elliott | ........................... 375/343 |
| 2007/0195914 | A1 * | 8/2007 | Chang et al. | ................... 375/343 |
| 2007/0291865 | A1 * | 12/2007 | Lanoiselee et al. | ........... 375/265 |

OTHER PUBLICATIONS

A. Steil et al (Digitising VHF FM sound broadcasting with DRM+(DRM Mode E), IEEE international symposium on broadband multimedia system and broadcasting, May 13-15, 2009, Bilbao, Spain, pp. 1-6).*

* cited by examiner

*Primary Examiner* — Shuwang Liu
*Assistant Examiner* — Helene Tayong
(74) *Attorney, Agent, or Firm* — Sughrue Mion, PLLC (57) ABSTRACT

Disclosed are an apparatus and a method for detecting a broadcasting signal. The signal detecting apparatus according to the exemplary embodiment of the present invention includes: a reference signal generator outputting a reference signal acquired by performing a correlation calculation between a current sample and a previous sample of a received signal which is an FM signal or a digital radio mondiale plus (DRM+) signal and then normalizing a result of the correlation calculation; and a discriminator detecting a maximum value of the reference signal and judging that the received signal is the FM signal when the maximum value of the reference signal is more than a predetermined threshold.

8 Claims, 8 Drawing Sheets

APPARATUS AND METHOD FOR DETECTING BROADCASTING SIGNAL

CROSS-REFERENCE TO RELATED APPLICATIONS

This application claims priority under 35 U.S.C. §119 to Korean Patent Application No. 10-2011-0143756, filed on Dec. 27, 2011, in the Korean Intellectual Property Office, the disclosure of which is incorporated herein by reference in its entirety.

TECHNICAL FIELD

The present invention relates to a digital broadcast receiver, and more particularly, to an apparatus and a method for detecting a broadcasting signal that can detect a desired broadcasting signal in a hybrid broadcasting mode.

BACKGROUND

As compared with an analog radio broadcasting, digital radio broadcasting has an advantage of providing various data services such as a text message, a slide show, traffic information, and a journal in addition to a high-quality stereo audio service.

Further, since the digital radio broadcasting can significantly reduce transmission power at the time of providing a service in the same range, several countries are preparing to convert the analog radio broadcasting into the digital radio broadcasting.

An orthogonal frequency division multiplexing (OFDM) based digital radio mondiale (DRM) plus system is a digital radio standard of Band I and II (47 to 174 MHz) and supports a data transfer rate of the maximum 185 kbps in a bandwidth of 100 kHz. Therefore, a lot of countries consider the DRM plus as the digital radio broadcasting which will replace the analog FM broadcasting.

Figure 1:
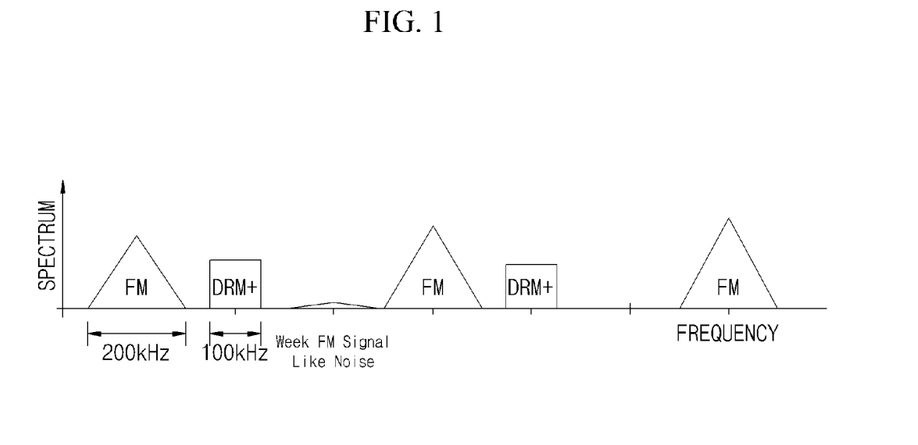
FIG. 1 is a diagram showing a frequency band of FM broadcasting and DRM+ broadcasting.

However, in order to completely switch the analog broadcasting into the digital broadcasting (ASO: Analog Switch Off), listeners need some time to prepare for the switching, and as a result, broadcasting companies plan a hybrid broadcasting providing the analog FM broadcasting and the DRM plus broadcasting as shown in FIG. 1 in parallel.

In the hybrid broadcasting, a DRM plus broadcast receiver or an FM broadcast receiver needs to distinguish an analog FM signal and a DRM plus signal without prior information on a channel.

However, since a streaming based broadcasting system does not have a fixed training symbol like a packet based burst data transfer system, the streaming based broadcasting system detects a transmission signal using a Guard-Interval correlation. That is, the broadcasting system in the related art compares whether a guard-interval correlation calculation result of a received signal is larger than a predetermined threshold to detect a signal of which the guard-interval correlation calculation result is larger than the predetermined threshold.

However, when the DRM plus broadcast receiver detects the DRM plus signal through the guard-interval correlation under the circumstances that the DRM plus broadcast receiver cannot know which broadcasting signal is received, a signal detection probability is low and a probability of a false alarm is high as the signal is misrecognized.

SUMMARY

An exemplary embodiment of the present invention provides an apparatus for detecting a broadcasting signal, including: a reference signal generator outputting a reference signal acquired by performing a correlation calculation between a current sample and a previous sample of a received signal which is an FM signal or a digital radio mondiale plus (DRM+) signal and then normalizing a result of the correlation calculation; and a discriminator detecting a maximum value of the reference signal and judging that the received signal is the FM signal when the maximum value of the reference signal is more than a predetermined threshold.

Another exemplary embodiment of the present invention provides a method for detecting a signal in a broadcast receiver, including: detecting a maximum value of a reference signal calculated by performing a correlation calculation between a current sample and a previous sample of a received signal which is an FM signal or a digital radio mondiale plus (DRM+) signal and then normalizing a result of the correlation calculation; verifying whether a maximum value of a correlation signal calculated by performing a guard-interval correlation calculation of the received signal and then normalizing a result of the guard-interval correlation calculation is more than a predetermined threshold when the maximum value of the reference signal is equal to or less than the threshold; and judging that the received signal is the DRM+ signal when the maximum value of the correlation signal is more than the threshold.

Other features and aspects will be apparent from the following detailed description, the drawings, and the claims.

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
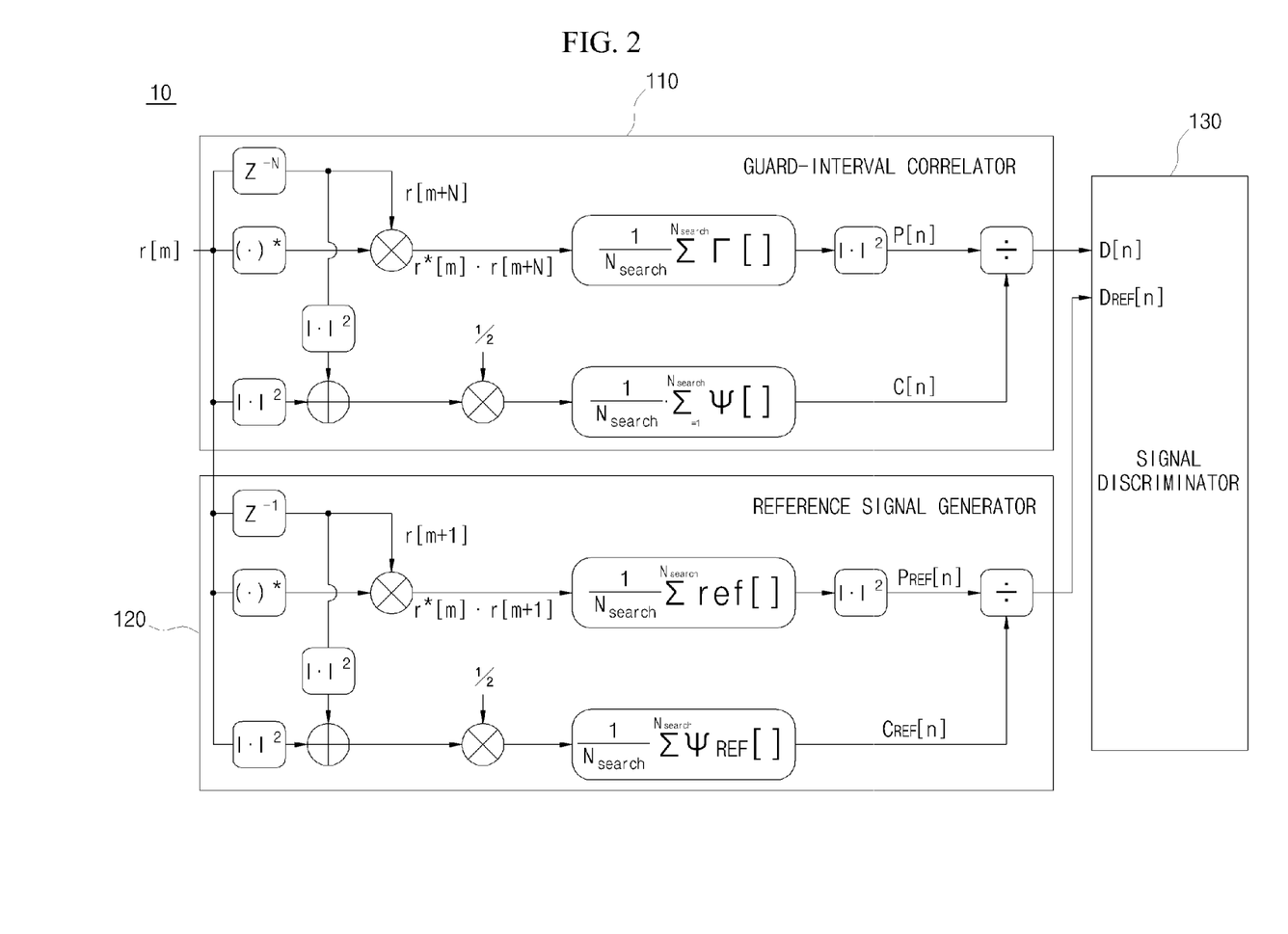
FIG. 2 is a configuration diagram showing an apparatus for detecting a DRM plus signal according to an exemplary embodiment of the present invention.

Hereinafter, exemplary embodiments of the present invention will be described in detail with reference to the accompanying drawings. FIG. 2 is a configuration diagram showing an apparatus for detecting a DRM Plus signal according to an exemplary embodiment of the present invention.

As shown in FIG. 2, the DRM plus signal detecting apparatus 10 according to the exemplary embodiment of the present invention includes a guard-interval correlator 110, a reference signal generator 120, and a signal discriminator 130.

The guard-interval correlator 110 receives a received signal r[m] to perform a guard-interval correlation of the received signal r[m] and divides the guard-interval correlation result by a normalization coefficient to output D[n] of which the magnitude is limited to a predetermined range.

First, the guard-interval correlator 110 performs the guard-interval correlation calculation of symbols of the received signal r[m] and a received signal r[m+N] acquired by delaying r[m] by N as shown in Equation 1 below.

$$\Gamma[T] = \frac{1}{S_{MaxDelay} \cdot N_G} \sum_{\tau=T}^{S_{MaxDelay}+T-1} \left[ \sum_{m=\tau}^{\tau+N_G-1} r*[m] \cdot r[m+N] \right] \qquad \text{[Equation 1]}$$

Herein, $N_G$ represents the number of samples of a guard-interval, N represents the magnitude of an FFT of DRM Plus, and $S_{MaxDelay}$ represents the number of samples included in the maximum path delay.

The guard-interval correlator 110 acquires an average of guard-interval correlated signals during $N_{Search}$ (the number of observed symbols) symbols as shown in Equation 2 in order to increase a signal detection probability under noise and time-varying channel environment.

$$P[n] = \left| \frac{1}{N_{search}} \sum_{l=1}^{N_{search}} \Gamma[l \cdot N_s + n] \right|^2 \qquad \text{[Equation 2]}$$

Herein, $N_S$ (=$N+N_G$) represents the number of samples of one DRM Plus symbol, l represents a coefficient of the DRM Plus symbol, and $N_{search}$ represents the number of observed symbols.

In this case, since P[n] varies largely under the time-varying channel environment, the magnitude of P[n] needs to be limited to a predetermined range by normalizing P[n]. To this end, the guard interval correlator 110 calculates a normalization coefficient for limiting the magnitude of P[n] to a predetermined range using Equation 3 below. In this case, the normalization coefficient may be calculated using average power of the received signal as shown in Equation 3 below.

$$\Psi[T] = \frac{1}{2 \cdot S_{MaxDelay} \cdot N_G} \sum_{\tau=T}^{S_{MaxDelay}+T-1} \left[ \sum_{m=\tau}^{\tau+N_G-1} \{|r[m]|^2 + |r[m+N]|^2\} \right] \qquad \text{[Equation 3]}$$

$$c[n] = \left( \frac{1}{N_{search}} \cdot \sum_{l=1}^{N_{search}} \Psi[l \cdot N_s + n] \right)$$

The guard-interval correlator 110 divides average P[n] during the $N_{search}$ symbols by the normalization coefficient C[n] as shown in Equation 4 below to output D[n].

$$D[n] = \frac{P[n]}{C[n]} \qquad \text{[Equation 4]}$$

The reference signal generator 120 performs the correlation calculation of the current sample and the previous sample of the received signal and thereafter, acquires an average during an observation symbol cycle to calculate a $P_{REF}[n]$ signal, as shown in Equation 5 below.

$$P_{REF}[n] = \left( \frac{1}{N_{search}} \cdot \sum_{l=1}^{N_{search}} \text{ref}[l \cdot N_s + n] \right)^2 \qquad \text{[Equation 5]}$$

Herein, $$\text{ref}[\tau] = \frac{1}{N_G} \sum_{m=\tau}^{\tau+N_G-1} r*[m] \cdot r[m+1].$$

The reference signal generator 120 divides the $P_{REF}[n]$ signal by a power value of the received signal as shown in Equation 6 below and normalizes the corresponding signal to generate the reference signal $D_{REF}[n]$.

$$\Psi_{REF}[\tau] = \frac{1}{2 \cdot N_G} \sum_{m=\tau}^{\tau+N_G-1} \{r^2[m] + r^2[m+1]\} \qquad \text{[Equation 6]}$$

$$C_{REF}[n] = \left( \frac{1}{N_G} \cdot \sum_{l=1}^{N_{search}} \Psi_{REF}[l \cdot N_s + n] \right)$$

$$D_{REF}[n] = \frac{P_{REF}[n]}{C_{REF}[n]}$$

Hereinafter, in a case where the DRM Plus signal is inputted and a case where the FM signal is inputted into the reference signal generator 120, reference signals outputted from the reference signal generator 120 will be described.

<<Type of Reference Signal Corresponding to Type of Received Signal>>

First, when the received signal r[m] is the DRM Plus signal, the reference signal $D_{REF}[n]$ becomes 0.

That is, according to a central limit theorem, as the magnitude of the FFT increases, an OFDM signal of a time domain has a complex Gaussian characteristic, and as a result, when r[m]=$r_{DRM}$+[m], if the observed symbol cycle is sufficiently large, ref[τ]≈0, $P_{REF}[n]$≈0. Therefore, $D_{REF}[n]$≈0 is calculated by Equation 6 above.

On the contrary, when the received signal r[m] is an analog FM signal $s_{FM}[m]$, the correlation result of the current sample and the previous sample calculated by the reference signal generator 120 is shown in Equation 7 below. In this case, in order to analyze a characteristic of the analog FM signal $s_{FM}[m]$, Equation 7 is summarized on the assumption that no channel varies under a flat-fading channel environment and during $N_S$ samples.

$$s_{FM}^*[m] \cdot s_{FM}[m+1]|_{baseband} = \left(\sqrt{A_{FM}}\, e^{j\phi_{FM}[m]}\right)^* \cdot \quad \text{[Equation 7]}$$
$$\left(\sqrt{A_{FM}}\, e^{j\phi_{FM}[m+1]}\right)$$
$$= A_{FM} \cdot e^{j(\phi_{FM}[m+1]-\phi_{FM}[m])}$$
$$= A_{FM} \cdot e^{jk_{FM}\Pi[m,1]}$$

Herein, $S_{FM}[m] = \sqrt{A_{FM}}\, e^{\phi_{FM}[m]}$ is a baseband signal of an analog FM, $A_{FM}$ represents power of an FM signal, $\phi_{FM}[m]$ as an FM instance has a relationship of $$\phi_{FM}[m] = 2\pi \cdot k_{FM} \sum_{\tau=-\infty}^{t} m[\tau]$$

with frequency sensitivity $k_{FM}$ and a message signal M[m] of the FM broadcasting, and $\Pi[m, n]$ represents $$\Pi[m, N] = \sum_{p=1}^{N} M[m+p]$$

which is the sum of m+1 samples to N samples.

On the assumption that $N_{search}$ is sufficiently large, since the FM signal of the time domain has a larger correlation value as a delay degree (lag) is smaller unlike the OFDM signal, the reference signal corresponding to the FM signal may be calculated as shown in Equation 8 below from the calculation result of the reference signal generator 120 by considering the relationship.

$$D_{REF}[n]\|_{TX=FM} = \frac{A_{FM}^2}{N_G^2 \cdot (A_{FM}+\sigma_n^2)} \cdot \left| E\left[\sum^{N_G} e^{j2\pi-k_{FM}M[m]}\right] \right|^2 \quad \text{[Equation 8]}$$

$D_{REF}[n]$ of Equation 8 has a value within a predetermined range as shown in Equation 9 below according to a phase shift of $2\pi k_{FM}\Pi[m,N]$ during $N_G$ samples. Herein, $\sigma^2$ represents a distribution of the received signal and $|E[\cdot]^2|$ represents an energy value of H.

$$0 < D_{REF}[n]_{rDRM+} < \frac{A_{FM}^2}{(A_{FM}+\sigma_n^2)} \quad \text{[Equation 9]}$$

Further, when the FM signal is received, since a phase shift speed of the reference signal generator 120 is lower than a phase shift speed of the guard-interval correlator 110, a reference signal $D_{REF}[n]r_{DRM+}$ when the DRM Plus signal is received has a value larger than a reference signal $D_{REF}[n]r_{FM}$ when the FM signal is received as shown in Equation 10 below.

$$0 < D_{REF}[n]_{rFM} < D_{REF}[n]_{rDRM+} < \frac{A_{FM}^2}{(A_{FM}+\sigma_n^2)} \quad \text{[Equation 10]}$$

As described above, since the reference signal generator 120 performs the correlation calculation of the current sample and the previous sample of the received signal, if the received signal is the DRM Plus signal (OFDM signal), the reference signal generator 120 outputs a value substantially close to 0. And when the reference signal generator 120 receives the FM signal, the reference signal generator 120 outputs a large value.

The signal discriminator 130 judges that the received signal is the FM signal when an output of the reference signal generator 120 is more than a predetermined threshold. While, the signal discriminator 130 judges that the received signal may be the DRM Plus signal, not the FM signal when the output of the reference signal generator 120 is equal to or less than the threshold. That is, the signal discriminator 130 detects the output of the reference signal generator 120 and a maximum value of the reference signal and judges that the received signal r[m] is the FM signal when the maximum value of the reference signal is more than the threshold.

When the signal discriminator 130 judges that the received signal may be the DRM Plus signal, the signal discriminator 130 detects the received DRM Plus signal using the output D[n] of the guard-interval correlator 110.

That is, the signal discriminator 130 judges that the received signal r[m] is the DRM Plus signal when the maximum value of D[n] is more than the threshold. In this case, the signal discriminator 130 judges that the received signal is noise when the received signal r[m] is less than the threshold.

Meanwhile, the reference signal generator 120 and the signal discriminator 130 of FIG. 2 are applied to the FM broadcast receiver to be used to extract the FM signal from the hybrid broadcasting.

Figure 3:
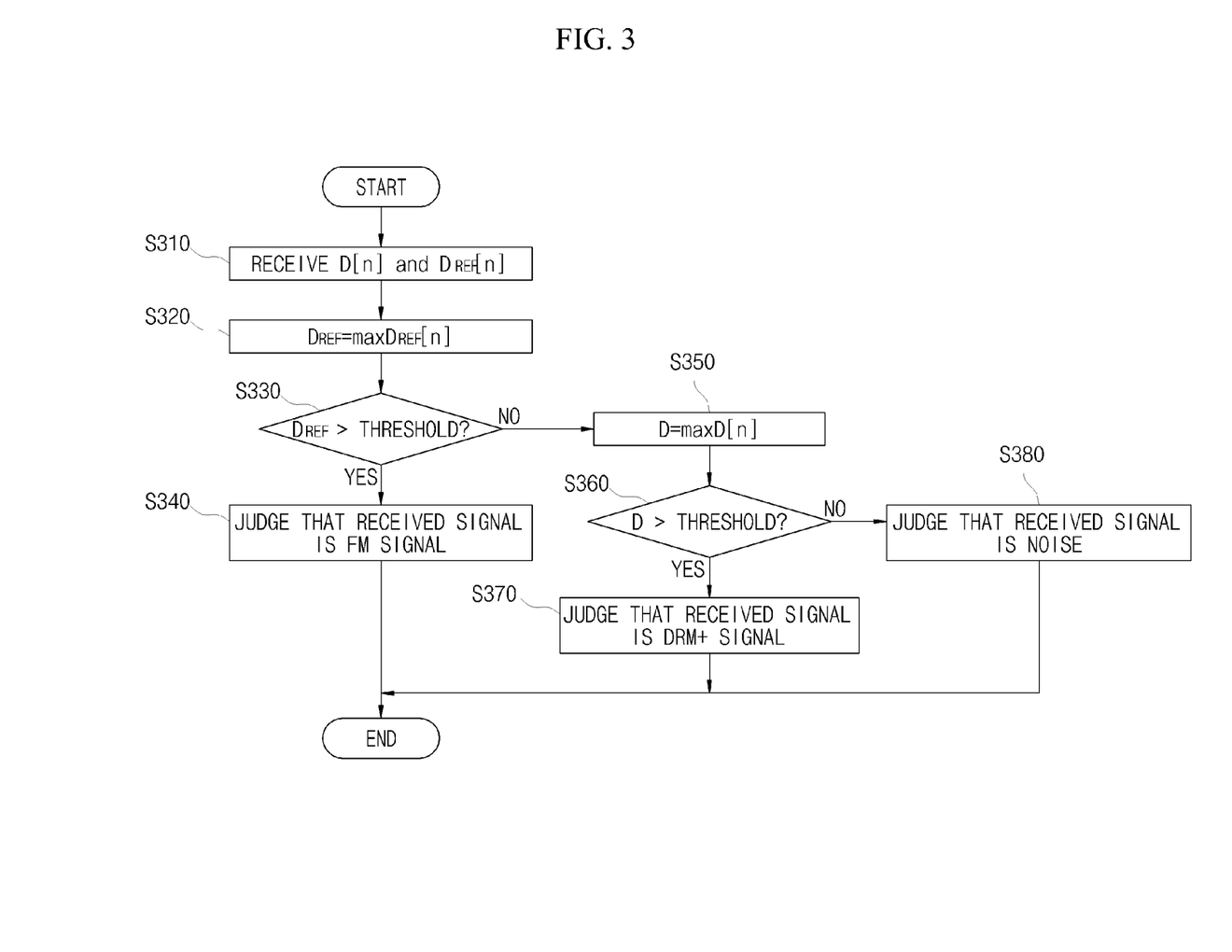
FIG. 3 is a flowchart showing a method for detecting a DRM Plus signal according to an exemplary embodiment of the present invention.

Hereinafter, a method for detecting a DRM Plus signal according to an exemplary embodiment of the present invention will be described with reference to FIG. 3. FIG. 3 is a flowchart showing a method for detecting a DRM Plus signal according to an exemplary embodiment of the present invention.

Referring to FIG. 3, a signal discriminator 130 receives a correlation signal D[n] calculated through guard-interval correlation and normalization and a reference signal $D_{REF}[n]$ calculated by correlating and normalizing a current sample and a previous sample (S310).

The signal discriminator 130 detects a maximum value $D_{REF}$ among the received reference signal $D_{REF}[n]$ (S320).

The signal discriminator 130 verifies whether the maximum value $D_{REF}$ of the reference signal is more than a predetermined threshold (S330).

The signal discriminator 130 judges that the received signal is an FM signal when the maximum value $D_{REF}$ of the reference signal is more than the threshold (S340). In this case, the signal discriminator 130 or other component demodulates the FM signal in a predetermined method to reproduce the demodulated FM signal through a speaker.

The signal discriminator 130 judges that the received signal may be a DRM Plus signal and calculates a maximum value D of the correlation signal D[n], when the maximum value $D_{REF}$ of the reference signal is equal to or less than the threshold (S350).

The signal discriminator 130 verifies whether the maximum value of the correlation signal is more than the threshold (S360).

The signal discriminator 130 judges that the received signal is the DRM Plus signal when the maximum value of the correlation signal is the threshold (S370). Then, the signal discriminator 130 or other component decodes the DRM Plus signal in a predetermined method to reproduce the decoded DRM Plus signal through the speaker.

The signal discriminator 130 judges that noise is received (No Signal) when the maximum value of the correlation signal is equal to or less than the threshold (S380).

Hereinafter, the performance of the method for detecting the broadcasting signal according to the exemplary embodiment of the present invention will be described with reference to FIGS. 4 to 6.

<<When Only Noise is Received>>

Figure 4:
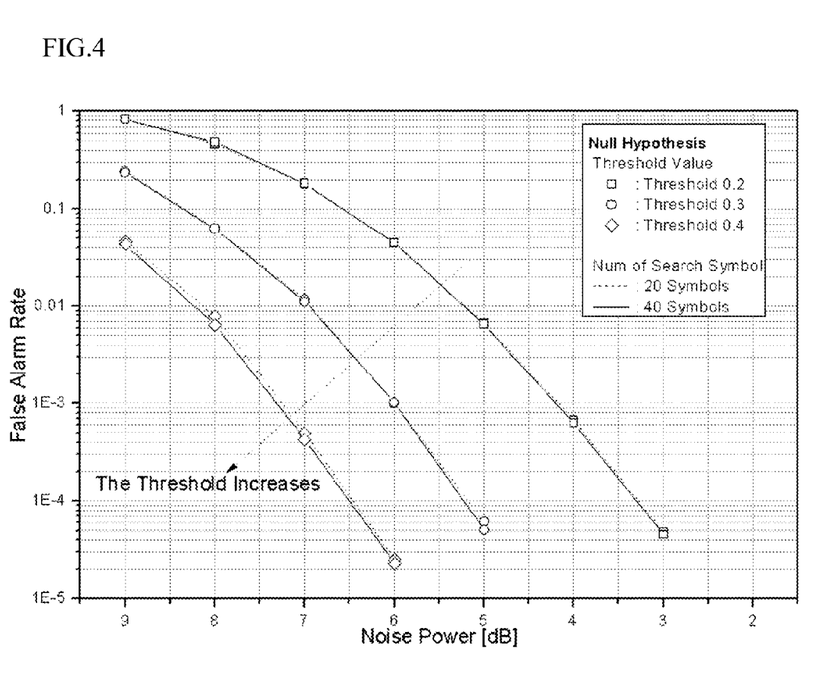
FIG. 4 is a graph showing a false alarm generation probability of a signal detecting method according to an exemplary embodiment of the present invention when only noise is received.

FIG. 4 is a graph showing a false alarm generation probability with respect to noise power of a signal detecting method according to an exemplary embodiment of the present invention when only noise is received. FIG. 4 shows cases in which the threshold is 0.2, 0.3, and 0.4 when the number of observed symbols is 20 and 40.

As shown in FIG. 4, when only the noise is received, the false alarm generation probability is not significantly different as compared with the number of observed symbols, but as the threshold increases, the false alarm generation probability decreases.

<<When FM Signal is Received>>

Figure 5A:
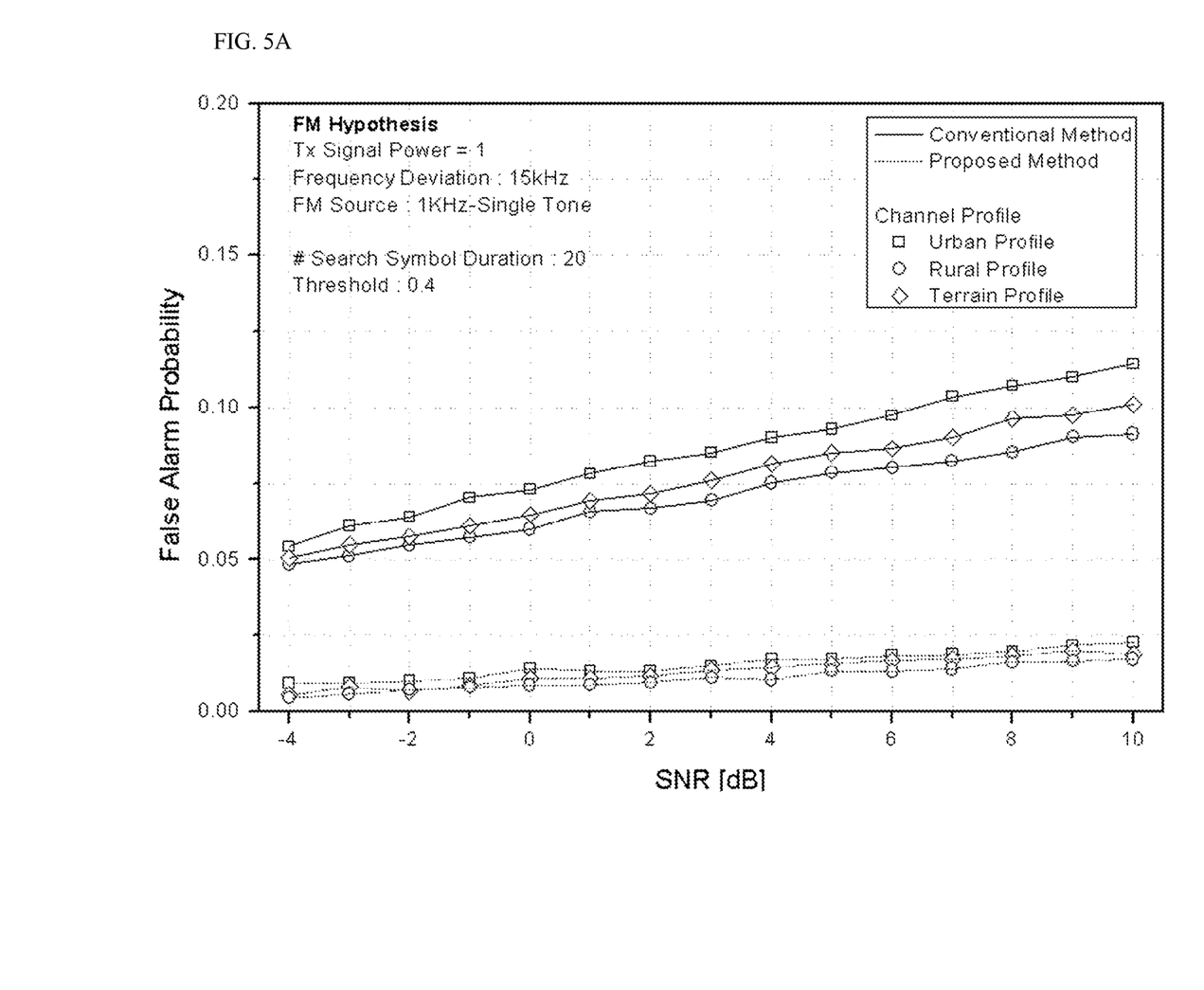
FIGS. 5A and 5B are graphs showing a false alarm generation frequency depending on a channel environment of the signal detecting method according to the exemplary embodiment of the present invention when an FM signal is received.
Figure 5B:
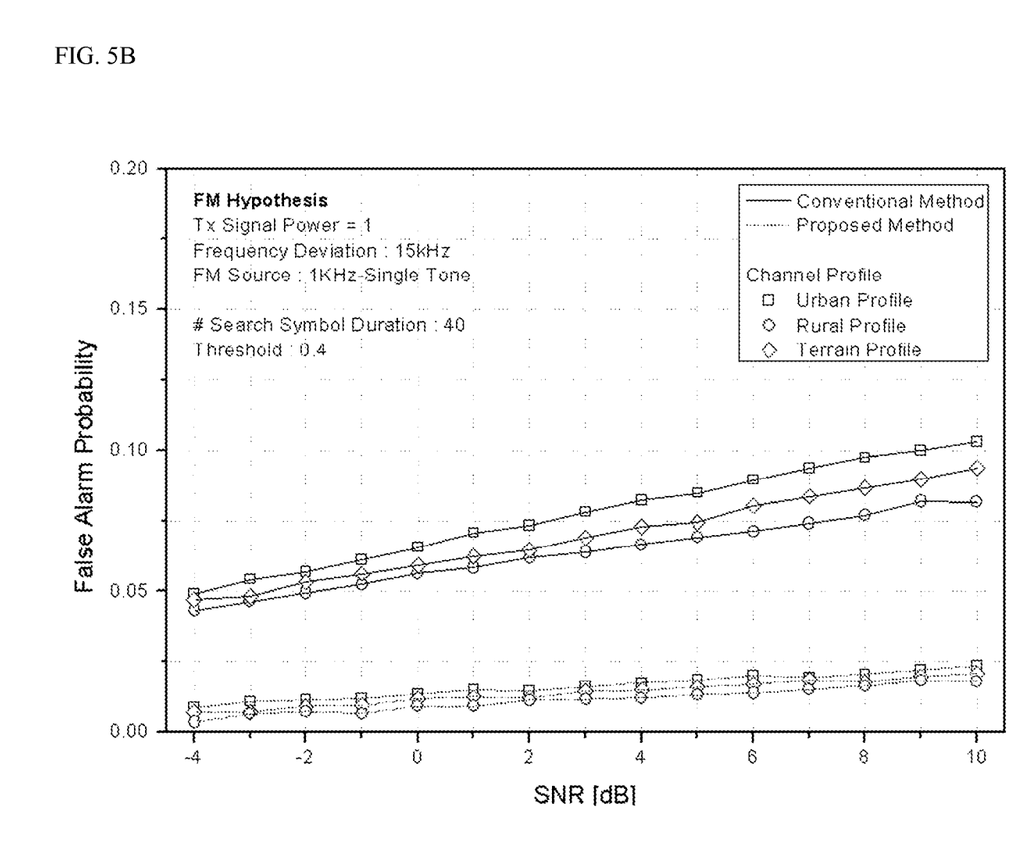

FIGS. 5A and 5B are graphs showing a false alarm generation frequency depending on a channel environment of the signal detecting method according to the exemplary embodiment of the present invention when an FM signal is received. Herein, the FM signal is a 1 kHz single-tone FM signal. FIG. 5A shows a case in which $N_{search}$ (search symbol duration)=20 and FIG. 5B shows a case in which $N_{search}$=40.

Similar to a case in which an SNR is 6 dB under an urban channel environment of FIG. 5A, the false alarm of approximately 9.7% is generated in the guard-interval correlation method in the related art, but the false alarm of 1.8% is generated in the signal detecting method of the exemplary embodiment of the present invention, and as a result, it can be seen that a false alarm generation frequency of the signal detecting method depending on the exemplary embodiment of the present invention is lower than the guard-interval correlation method in the related art.

In FIG. 5B, in the signal detecting method according to the exemplary embodiment of the present invention, when the number of observed symbols increases from 20 to 40, the false alarm generation frequency slightly decreases.

<<When DRM+ Signal is Received>>

Figure 6A:
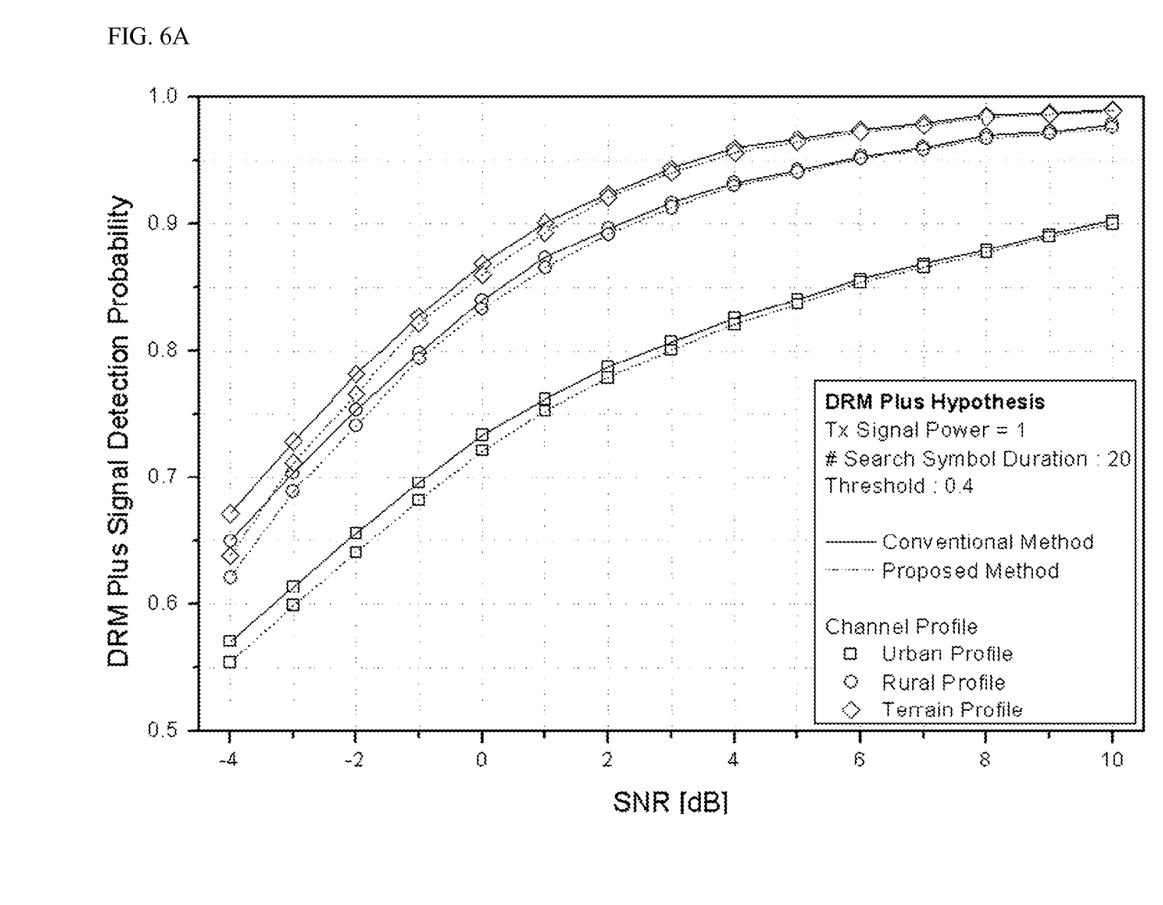
FIGS. 6A and 6B are graphs showing a detection probability depending on the channel environment of the signal detecting method according to the exemplary embodiment of the present invention when a DRM+ signal is received.
Figure 6B:
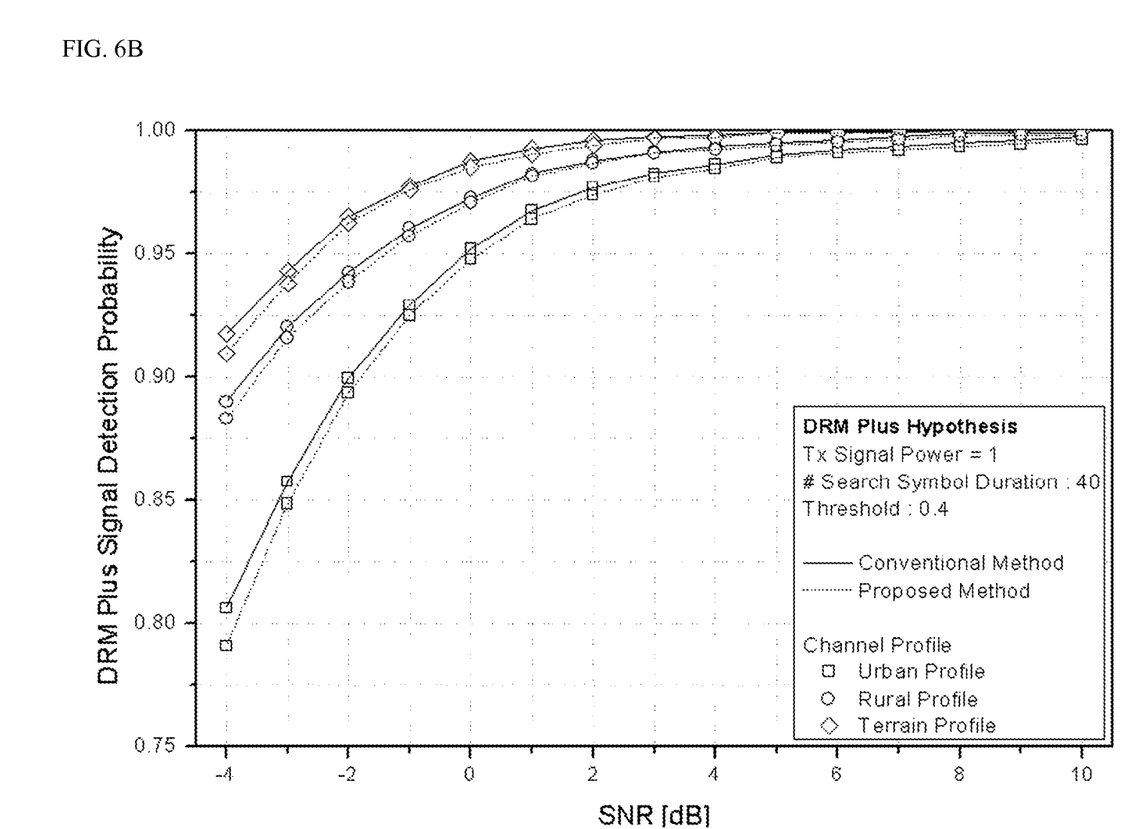

FIGS. 6A and 6B are graphs showing a detection probability depending on the channel environment of the signal detecting method according to the exemplary embodiment of the present invention when a DRM+ signal is received. FIG. 6A shows a case in which $N_{search}$=20 and FIG. 6B shows a case in which $N_{search}$=40.

Referring to FIGS. 6A and 6B, the signal detecting method according to the exemplary embodiment of the present invention meets a detection probability of 95% when the SNRs of all the considered channels are 0.5 dB and has higher performance than the guard-interval correlation method in the related art by at least 0.1 to 0.5 dB. Further, even in the signal detecting method according to the exemplary embodiment of the present invention similarly as the guard-interval correlation method in the related art, as the number of observed symbols increases, the detection probability is improved.

As set forth above, according to the exemplary embodiments of the present invention, the analog FM signal and the DRM Plus signal that are broadcasted in the hybrid mode can be easily distinguished from each other by performing the correlation calculation considering the characteristic of the OFDM symbol, and the signal detection probability can be increased and the false alarm generation probability can be decreased as compared with the guard-interval correlation method in the related art.

The exemplary embodiments of the present invention can be easily applied as adding the calculation block for distinguishing the FM signal and the DRM Plus broadcasting to the guard-interval correlator in the related art and some modification of software.

Further, the exemplary embodiments of the present invention are applied to even the FM broadcast receiver in addition to the DRM Plus broadcast receiver, thereby making it possible to support the FM broadcast receiver to extract the FM broadcasting signal in the hybrid broadcasting.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for detecting a signal, comprising:
a reference signal generator configured to output a reference signal acquired by performing a correlation calculation between a current sample and a previous sample of a received signal and to normalize a result of the correlation calculation;
a discriminator configured to detect a maximum value of the reference signal and to judge whether the received signal is a frequency modulation (FM) signal based on the maximum value of the reference signal relative to a predetermined threshold, and judges whether the received signal is a digital radio mondiale plus (DRM+) signal according to the predetermined threshold when the received signal is judged not to be a FM signal; and
a guard-interval correlator configured to output a correlation signal by performing a guard-interval correlation calculation of the received signal and then normalizing a result of the guard-interval correlation calculation,
wherein the discriminator is configured to detect a maximum value of the correlation signal when the maximum value of the correlation signal is equal to or less than the threshold and when the maximum value of the correlation signal is more than the threshold, judges that the received signal is the DRM+ signal.

2. The apparatus of claim 1, wherein the reference signal generator is configured to perform the correlation calculation between the current sample and the previous sample of the received signal and thereafter, acquires an average during a predetermined observation symbol cycle and normalizes the average during the observation symbol cycle using average power of the current sample and the previous sample to generate the reference signal.

3. The apparatus of claim 1, wherein the discriminator judges that the received signal is a DRM+ signal when the maximum value of the reference signal is equal to or less than the threshold and the received signal is not a FM signal.

4. The apparatus of claim 1, wherein the discriminator is configured to judge that the received signal is noise when the maximum value of the correlation signal is equal to or less than the threshold.

5. A method for detecting a signal in a broadcast receiver, comprising:
detecting a maximum value of a reference signal calculated by performing a correlation calculation between a current sample and a previous sample of a received signal which is an FM signal or a digital radio mondiale plus (DRM+) signal and then normalizing a result of the correlation calculation;

verifying whether a maximum value of a correlation signal calculated by performing a guard-interval correlation calculation of the received signal and then normalizing a result of the guard-interval correlation calculation is more than a predetermined threshold when the maximum value of the reference signal is equal to or less than the threshold; and judging that the received signal is the DRM+ signal when the maximum value of the correlation signal is more than the threshold.

6. The method of claim 5, wherein the verifying includes judging that the received signal is the FM signal when the maximum value of the reference signal is more than the threshold.

7. The method of claim 5, further comprising:

judging that the received signal is noise when the maximum value of the correlation signal is equal to or less than the threshold.

8. The apparatus of claim 1, wherein the discriminator is configured to judge that the received signal is an FM signal when the maximum value of the reference signal is more than the predetermined signal.

* * * * *